US011814794B2

(12) United States Patent
Imai et al.

(10) Patent No.: US 11,814,794 B2
(45) Date of Patent: Nov. 14, 2023

(54) CELLULOSE FIBER MOLDED PRODUCT AND METHOD FOR MANUFACTURING THE SAME

(71) Applicant: Daio Paper Corporation, Ehime (JP)

(72) Inventors: Takaaki Imai, Ehime (JP); Takahiro Miyoshi, Ehime (JP); Junya Okawa, Ehime (JP)

(73) Assignee: Daio Paper Corporation, Ehime (JP)

( * ) Notice: Subject to any disclaimer, the term of this patent is extended or adjusted under 35 U.S.C. 154(b) by 198 days.

(21) Appl. No.: 17/275,006

(22) PCT Filed: Sep. 18, 2019

(86) PCT No.: PCT/JP2019/036541
§ 371 (c)(1),
(2) Date: Mar. 10, 2021

(87) PCT Pub. No.: WO2020/071120
PCT Pub. Date: Apr. 9, 2020

(65) Prior Publication Data
US 2022/0064858 A1 Mar. 3, 2022

(30) Foreign Application Priority Data

Oct. 5, 2018 (JP) ................. 2018-190492

(51) Int. Cl.
*D21H 11/18* (2006.01)
*D21J 1/04* (2006.01)
*D21J 3/12* (2006.01)

(52) U.S. Cl.
CPC ............... *D21H 11/18* (2013.01); *D21J 1/04* (2013.01); *D21J 3/12* (2013.01)

(58) Field of Classification Search
CPC ........ D21H 11/18; D21H 21/18; D21H 11/14; D21H 11/20; D21H 15/02; D21H 27/10; D21J 1/04; D21J 3/12; D21J 5/00; D21J 1/00; D21J 3/00; D21J 7/00; C08L 1/02; C08B 15/08; C08B 15/00; B82Y 30/00; B82Y 40/00; C08J 2301/02; D21B 1/32; D21B 1/345; D21C 5/005; D21C 9/007; D21D 1/30
See application file for complete search history.

(56) References Cited

U.S. PATENT DOCUMENTS

| | | | | |
|---|---|---|---|---|
| 7,381,294 B2 * | 6/2008 | Suzuki | ................. | D21D 1/30 162/187 |
| 8,663,425 B2 * | 3/2014 | Noishiki | ................. | D21H 17/33 162/182 |
| 8,871,922 B2 * | 10/2014 | Hu | ................. | C08H 8/00 527/312 |
| 8,945,345 B2 * | 2/2015 | Laine | ................. | D21H 17/69 162/175 |
| 9,074,077 B2 * | 7/2015 | Harada | ................. | C08B 11/20 |
| 9,327,426 B2 * | 5/2016 | Yano | ................. | C08L 97/02 |
| 9,371,616 B2 * | 6/2016 | Ihara | ................. | B32B 27/365 |
| 9,506,197 B2 * | 11/2016 | Laine | ................. | D21H 17/74 |
| 9,518,364 B2 * | 12/2016 | Heiskanen | ................. | D21H 11/18 |
| 9,988,762 B2 * | 6/2018 | Bilodeau | ................. | D21D 1/306 |
| 10,695,947 B2 * | 6/2020 | Bilodeau | ................. | B27N 3/002 |
| 11,077,648 B2 * | 8/2021 | Heiskanen | ................. | B32B 29/08 |
| 11,162,221 B2 * | 11/2021 | Lundin | ................. | D21H 17/33 |
| 11,248,343 B2 * | 2/2022 | Knöös | ................. | C08L 1/02 |
| 11,384,210 B2 * | 7/2022 | Kritzinger | ................. | B29C 51/10 |
| 11,525,015 B2 * | 12/2022 | Takayama | ................. | D21H 21/22 |
| 2010/0173146 A1 * | 7/2010 | Ihara | ................. | B32B 27/36 428/323 |
| 2012/0118520 A1 * | 5/2012 | Noishiki | ................. | D21H 11/18 162/164.7 |
| 2013/0005866 A1 * | 1/2013 | Yano | ................. | C08J 5/045 524/13 |
| 2013/0025920 A1 * | 1/2013 | Shimizu | ................. | C08L 1/08 522/170 |
| 2013/0180680 A1 * | 7/2013 | Axrup | ................. | D21H 21/18 162/158 |
| 2013/0345341 A1 * | 12/2013 | Harada | ................. | C08J 5/005 536/56 |
| 2015/0114581 A1 * | 4/2015 | Kinnunen | ................. | D21F 11/002 162/158 |
| 2015/0315747 A1 * | 11/2015 | Heiskanen | ................. | D21F 11/00 162/158 |
| 2017/0073893 A1 * | 3/2017 | Bilodeau | ................. | D21D 1/306 |
| 2019/0062998 A1 * | 2/2019 | Chen | ................. | D21H 27/10 |
| 2021/0246609 A1 * | 8/2021 | Martin | ................. | B32B 5/024 |
| 2022/0064437 A1 * | 3/2022 | Ozcan | ................. | C08B 3/10 |

(Continued)

FOREIGN PATENT DOCUMENTS

| | | | | | |
|---|---|---|---|---|---|
| EP | | 3845706 A1 * | 7/2021 | ............. | C08B 15/08 |
| EP | | 3845706 A4 * | 6/2022 | ............. | C08B 15/08 |

(Continued)

OTHER PUBLICATIONS

Machine Translation of JPH-10-311000 A. (Year: 1998).*

(Continued)

*Primary Examiner* — Jose A Fortuna
(74) *Attorney, Agent, or Firm* — ANDRUS INTELLECTUAL PROPERTY LAW

(57) ABSTRACT

A cellulose fiber molded product having improved tensile elastic modulus and a method for manufacturing the molded product is provided. The cellulose fiber molded product contains cellulose fibers as the main component, in which the cellulose fibers contain pulp and defibrated fibers, and the defibrated fibers contain microfibrillated cellulose. The method for manufacturing the molded product includes preparing a cellulose fiber slurry using the pulp and the defibrated fibers, forming wet paper from the cellulose fiber slurry, and dehydrating, pressurizing, and heating the wet paper. The defibrated fibers include microfibrillated cellulose, or microfibrillated cellulose and cellulose nanofibers.

5 Claims, 1 Drawing Sheet

(56) References Cited

U.S. PATENT DOCUMENTS

| | | | | |
|---|---|---|---|---|
| 2022/0064858 A1* | 3/2022 | Imai | ........................ | C08B 15/08 |
| 2022/0289999 A1* | 9/2022 | Brown | ....................... | C08L 5/04 |
| 2023/0130544 A1* | 4/2023 | Kritzinger | .................. | C08J 5/18 |
| | | | | 264/570 |

FOREIGN PATENT DOCUMENTS

| | | | | | |
|---|---|---|---|---|---|
| JP | 8-158299 | | 6/1996 | | |
| JP | 10-311000 | | 11/1998 | | |
| JP | 2013-011026 | | 1/2013 | | |
| JP | 2013-76177 | | 4/2013 | | |
| JP | 2013076177 A | * | 4/2013 | ............ | C08B 15/08 |
| JP | 2018066099 A | | 4/2018 | | |
| JP | 2018066099 A | * | 4/2018 | ............ | C08B 15/08 |
| JP | 2018-90953 | | 6/2018 | | |
| JP | 2019-31770 | | 2/2019 | | |
| JP | 2020059932 A | * | 4/2020 | ............ | C08B 15/08 |
| WO | 2012/017953 | | 2/2012 | | |
| WO | 2014/140564 | | 9/2014 | | |
| WO | WO-2014140564 A1 | * | 9/2014 | ............... | D21B 1/12 |
| WO | 2017/064559 | | 4/2017 | | |
| WO | WO-2020071120 A1 | * | 4/2020 | ............ | C08B 15/08 |

OTHER PUBLICATIONS

Machine Translation of JP-2013-076177 A. (Year: 2013).*
International Search Report for PCT/JP2019/036541, dated Nov. 5, 2019.

* cited by examiner

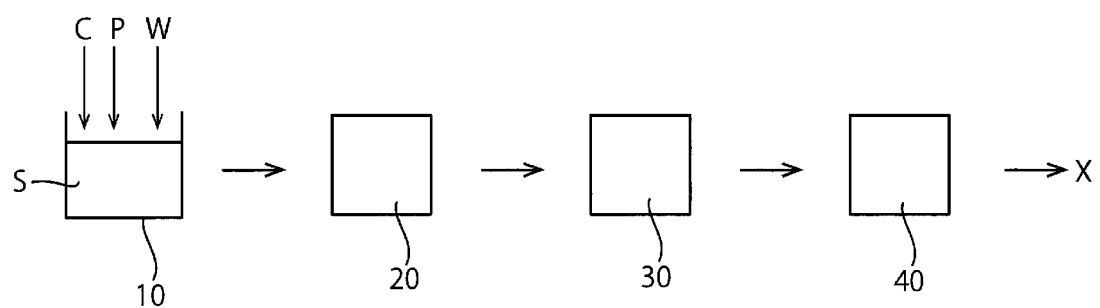

CELLULOSE FIBER MOLDED PRODUCT AND METHOD FOR MANUFACTURING THE SAME

TECHNICAL FIELD

The present invention relates to a cellulose fiber molded product and a method for manufacturing the same.

BACKGROUND ART

Cellulose nanofibers (CNF) obtained by defibrating cellulose fibers to a nano level are expected to be used in various applications because the cellulose nanofibers are excellent in strength, elasticity, thermal stability, and the like. As one of them, there is a cellulose nanofiber molded product obtained by, for example, drying and molding a slurry of cellulose nanofibers. For example, JP 2013-11026 A proposes a high-strength material (molded product) containing cellulose nanofibers as the main component. JP 2013-11026 A makes various proposals that specify the physical properties of the cellulose nanofibers.

However, at present, the present inventors recognize that there is a limit to improvement of the tensile elastic modulus of a molded product only by improving the physical properties of cellulose nanofibers as in JP 2013-11026 A.

SUMMARY OF INVENTION

Technical Problem

A main problem to be solved by the present invention is to provide a cellulose fiber molded product having improved tensile elastic modulus, preferably a cellulose fiber molded product also having improved tensile strength, and a method for manufacturing the same.

Solution to Problem

Cellulose nanofibers have a poor dehydration property and require a large amount of energy to be dried. As a result, the fibers may be thermally deteriorated during the drying process, and the quality of an obtained molded product may deteriorate. From this, the present inventors consider that there is a limit only by improving the physical properties of the cellulose nanofibers as described in the above-described literature. Meanwhile, it has been found that when defibrated fibers are used as a part of cellulose fibers and pulp is used for the balance, it is convenient for manufacture (improvement of dehydration property), the quality of an obtained molded product is improved, and the tensile elastic modulus is also within an acceptable range. In addition, in this case, it has been found that a better balance between the quality and tensile elastic modulus of a molded product is obtained when a microfibrillated cellulose (MFC) is used as a part or all of the defibrated fibers than when cellulose nanofibers are used as all of the defibrated fibers. Furthermore, it has been found that a better tensile strength is obtained when cellulose nanofibers as a complementary material to microfibrillated cellulose are used as a part of the defibrated fibers than when the microfibrillated cellulose is used as all of the defibrated fibers. The following means have been reached based on such findings.

A cellulose fiber molded product containing cellulose fibers as a main component,
wherein the cellulose fibers contain pulp and defibrated fibers, and
the defibrated fibers contain a microfibrillated cellulose.

The cellulose fiber molded product,
wherein the defibrated fibers contain, in addition to the microfibrillated cellulose, cellulose nanofibers as a complementary material to the microfibrillated cellulose.

The cellulose fiber molded product,
wherein the content percentage of the cellulose nanofibers in the cellulose fibers is more than 0% by mass and 70% by mass or less.

The cellulose fiber molded product,
wherein the pulp has an average fiber diameter of 10 to 100 μm, the microfibrillated cellulose has an average fiber diameter of 0.1 to 10 μm, and the cellulose nanofibers have an average fiber diameter of 10 to 100 nm, and
the content percentage of the pulp in the cellulose fibers is 5 to 20% by mass.

A method for manufacturing a cellulose fiber molded product, the method including:
preparing a cellulose fiber slurry using pulp and defibrated fibers; forming wet paper from the cellulose fiber slurry; and pressurizing and heating the wet paper to prepare a molded product,
wherein as the defibrated fibers, microfibrillated cellulose, or microfibrillated cellulose and cellulose nanofibers are used.

Advantageous Effects of Invention

The present invention provides a cellulose fiber molded product having improved tensile elastic modulus, preferably a cellulose fiber molded product also having improved tensile strength, and a method for manufacturing the same.

BRIEF DESCRIPTION OF DRAWINGS

FIG. 1 is an explanatory diagram of a method for manufacturing a molded product.

DESCRIPTION OF EMBODIMENTS

Next, an embodiment for carrying out the present invention will be described. Note that the present embodiment is an example of the present invention. The scope of the present invention is not limited to the scope of the present embodiment.

The cellulose fiber molded product of the present embodiment contains cellulose fibers as the main component. The cellulose fibers contain pulp and defibrated fibers. Furthermore, the defibrated fibers contain microfibrillated cellulose, and preferably further contain cellulose nanofibers as a complementary material to the microfibrillated cellulose.

The cellulose fiber molded product of the present embodiment is obtained, for example, by preparing a cellulose fiber slurry using pulp and defibrated fibers, forming wet paper from the cellulose fiber slurry, and pressurizing and heating the wet paper. Hereinafter, description will be made in order.

(Cellulose Nanofibers)

In the present embodiment, the cellulose nanofibers are used as a complementary material to microfibrillated cellulose and supplement a role of the microfibrillated cellulose. In this regard, when the microfibrillated cellulose is used as the defibrated fibers, tensile elastic modulus is improved, but tensile strength decreases. However, when the cellulose nanofibers are also contained as the defibrated fibers, sufficient tensile strength is obtained. Therefore, in the cellulose fibers of the present embodiment, inclusion of the microfibrillated cellulose is necessary. The effect of the present invention cannot be obtained in a form containing only the cellulose nanofibers without containing the microfibrillated cellulose.

The cellulose nanofibers have a role to increase hydrogen bonding points of cellulose fibers and thereby assist strength development of a molded product or the like. The cellulose nanofibers may be obtained by defibrating (micronizing) raw material pulp.

As the raw material pulp for the cellulose nanofibers, one or more kinds may be selected for use from the group consisting of, for example, wood pulp made from hardwood, softwood, or the like, non-wood pulp made from straw, bagasse, cotton, hemp, bast fibers, or the like, and de-inked pulp (DIP) made from recovered used paper, waste paper, or the like. Note that the above various raw materials may be, for example, in a state of a ground product called a cellulose-based powder.

However, wood pulp is preferably used in order to avoid contamination with impurities as much as possible. As the wood pulp, for example, one or more kinds may be selected for use from the group consisting of chemical pulp such as hardwood kraft pulp (LKP) or softwood kraft pulp (NKP), and mechanical pulp (TMP).

The hardwood kraft pulp may be hardwood bleached kraft pulp, hardwood unbleached kraft pulp, or hardwood semibleached kraft pulp. Similarly, the softwood kraft pulp may be softwood bleached kraft pulp, softwood unbleached kraft pulp, or softwood semibleached kraft pulp.

As the mechanical pulp, one or more kinds may be selected for use from the group consisting of, for example, stone ground pulp (SGP), pressure stone ground pulp (PGW), refiner ground pulp (RGP), chemiground pulp (CGP), thermoground pulp (TGP), ground pulp (GP), thermomechanical pulp (TMP), chemithermomechanical pulp (CTMP), refiner mechanical pulp (RMP), and bleached thermomechanical pulp (BTMP).

Prior to the defibration of the cellulose nanofibers, pretreatment may also be performed using a chemical method. Examples of the pretreatment using a chemical method include hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), and reduction of polysaccharides with a reducing agent (reduction treatment).

By performing an alkali treatment prior to the defibration, a part of the hydroxyl groups of hemicellulose or cellulose included in the pulp is dissociated, and the molecules are anionized to weaken the intramolecular and intermolecular hydrogen bonds, resulting in promoted dispersion of cellulose fibers in the defibration.

As an alkali used for the alkali treatment, for example, organic alkali such as sodium hydroxide, lithium hydroxide, potassium hydroxide, aqueous ammonia solution, tetramethylammonium hydroxide, tetraethylammonium hydroxide, tetrabutylammonium hydroxide, or benzyltrimethylammonium hydroxide may be used. However, sodium hydroxide is preferably used from a viewpoint of manufacturing cost.

When the enzyme treatment, acid treatment, or oxidation treatment is performed prior to the defibration, the water retention degree of the cellulose nanofibers may be lowered, the crystallinity may be increased, and the homogeneity may be increased. In this regard, when the water retention degree of the cellulose nanofibers is low, the cellulose nanofibers are easily dehydrated, and the dehydration property of the cellulose fiber slurry is improved.

When the enzyme treatment, acid treatment, or oxidation treatment is performed on the raw material pulp, the amorphous region of hemicellulose or cellulose included in the pulp is decomposed. As a result, energy required for the micronization treatment may be reduced, and the homogeneity and dispersibility of the cellulose fibers may be improved. The dispersibility of the cellulose fibers contributes to the homogeneity of a molded product or the like, for example, when the molded product or the like is manufactured from a cellulose fiber slurry. However, since the pretreatment reduces the aspect ratio of the cellulose nanofibers, it is preferable to avoid excessive pretreatment.

The defibration of the raw material pulp may be performed by beating the raw material pulp using, for example, a beater, a homogenizer such as a high-pressure homogenizer or a high-pressure homogenizing apparatus, a millstone friction machine such as a grinder or a mill, a single-screw kneader, a multi-screw kneader, a kneader refiner, or a jet mill. However, the defibration is preferably performed using a refiner or a jet mill.

The defibration of the raw material pulp is preferably performed such that the average fiber diameter, average fiber length, water retention degree, crystallinity, peak value of pseudo particle size distribution, pulp viscosity, and B-type viscosity of a dispersion of the resulting cellulose nanofibers fall within the desired values or are evaluated as will be described below.

The average fiber diameter (average fiber width, average diameter of single fibers) of the cellulose nanofibers is preferably 10 to 100 nm, more preferably 15 to 90 nm, and particularly preferably 20 to 80 nm. When the average fiber diameter of the cellulose nanofibers is less than 10 nm, the dehydration property may deteriorate. In addition, the molded product or the like will be too dense, and the drying property may deteriorate.

Meanwhile, when the average fiber diameter of the cellulose nanofibers exceeds 100 nm, the effect of increasing hydrogen bonding points may not be obtained.

The average fiber diameter of the cellulose nanofibers may be adjusted by, for example, selection, pretreatment, defibration, or the like of the raw material pulp.

A method for measuring the average fiber diameter of the cellulose nanofibers is as follows.

First, 100 ml of an aqueous dispersion of cellulose nanofibers having a solid concentration of 0.01 to 0.1% by mass is filtered through a Teflon (registered trademark) membrane filter, and solvent substitution is performed once with 100 ml of ethanol and three times with 20 ml of t-butanol. Next, the resulting product is lyophilized and coated with osmium to obtain a sample. An electron microscope SEM image of this sample is observed at any magnification of 3,000 to 30,000 depending on the width of the fibers constituting the sample. Specifically, two diagonals are drawn on the observation image, and three straight lines passing the intersection of the diagonals are arbitrarily drawn. Furthermore, the widths of 100 fibers in total intersecting the three straight lines are visually measured. Then, the median diameter of the measured values is taken as the average fiber diameter.

The average fiber length (length of a single fiber) of the cellulose nanofibers is preferably 0.3 to 2000 μm, more preferably 0.4 to 200 μm, and particularly preferably 0.5 to 20 μm. When the average fiber length of the cellulose nanofibers is less than 0.3 μm, the ratio of fibers that flow out during the dehydration process increases when the molded product or the like is manufactured, and the strength of the molded product or the like may not be ensured.

Meanwhile, when the average fiber length of the cellulose nanofibers exceeds 2000 μm, the fibers are likely to be entangled with each other, and the surface property of the molded product or the like may deteriorate.

The average fiber length of the cellulose nanofibers may be adjusted by, for example, selection, pretreatment, or defibration of the raw material pulp.

The average fiber length of the cellulose nanofibers is measured in a manner similar to the case of the average fiber diameter, and the length of each fiber is visually measured. The median length of the measured values is taken as the average fiber length.

The water retention degree of the cellulose nanofibers is, for example, 90 to 600%, preferably 220 to 500%, and more preferably 240 to 460%. When the water retention degree of the cellulose nanofibers is less than 200%, the dispersibility of the cellulose nanofibers deteriorates, and the cellulose nanofibers may not be mixed uniformly with the pulp.

Meanwhile, when the water retention degree of the cellulose nanofibers exceeds 600%, the water retention capacity of the cellulose nanofibers themselves is high, and the dehydration property of the cellulose fiber slurry may deteriorate.

The water retention degree of the cellulose nanofibers may be adjusted by, for example, selection, pretreatment, or defibration of the raw material pulp.

The water retention degree of the cellulose nanofibers is a value measured in accordance with JAPAN TAPPI No. 26 (2000).

The crystallinity of the cellulose nanofibers is preferably 45 to 90%, more preferably 55 to 88%, and particularly preferably 60 to 86%. When the crystallinity of the cellulose nanofibers is within the above range, the strength of the molded product or the like may be ensured.

The crystallinity may be adjusted arbitrarily by, for example, selection, pretreatment, or defibration of the raw material pulp.

The pseudo particle size distribution curve of the cellulose nanofibers preferably has one peak. When the pseudo particle size distribution curve of the cellulose nanofibers has one peak, the cellulose nanofibers have high uniformity of fiber length and fiber diameter, which results in excellent dehydration property of the cellulose fiber slurry.

The peak value of the cellulose nanofibers is, for example, 1 to 100 μm, preferably 3 to 800 μm, and more preferably 5 to 60 μm.

The peak value of the cellulose nanofibers may be adjusted by, for example, selection, pretreatment, or defibration of the raw material pulp.

The peak value of the cellulose nanofibers is a value measured in accordance with ISO-13320 (2009). More specifically, first, a volume-based particle size distribution of an aqueous dispersion of the cellulose nanofibers is determined using a particle size distribution measuring device (a laser diffraction/scattering type particle size distribution measuring device manufactured by Seishin Enterprise Co., Ltd.). Next, the median diameter of the cellulose nanofibers is measured from this distribution. This median diameter is taken as the peak value.

The pulp viscosity of the cellulose nanofibers is preferably 1 to 10 cps, more preferably 1 to 9 cps, and particularly preferably 1 to 8 cps. The pulp viscosity is the viscosity of a solution obtained by dissolving cellulose in a copper ethylenediamine solution. The larger the pulp viscosity, the higher the degree of polymerization of cellulose. When the pulp viscosity is within the above range, it is possible to maintain the mechanical properties of the molded product while the dehydration property is imparted to the slurry.

If necessary, the cellulose nanofibers obtained by the defibration may be dispersed in an aqueous medium to prepare a dispersion prior to being mixed with the microfibrillated cellulose or pulp. The entire aqueous medium is particularly preferably water (aqueous solution). However, the aqueous medium may partially be another liquid that is compatible with water. As the other liquid, for example, a lower alcohol having 3 or less carbon atoms may be used.

The B-type viscosity of the dispersion of the cellulose nanofibers (concentration 1%) is preferably 10 to 4000 cps, more preferably 80 to 3000 cps, and particularly preferably 100 to 2000 cps. When the B-type viscosity of the dispersion is within the above range, mixing with the microfibrillated cellulose or the pulp is easy, and the dehydration property of the cellulose fiber slurry is improved.

The B-type viscosity of the dispersion of the cellulose nanofibers (solid concentration 1%) is a value measured in accordance with JIS-Z8803 (2011) "Method for measuring viscosity of liquid". The B-type viscosity is a resistance torque when a dispersion is stirred, and a higher B-type viscosity means that more energy is required for stirring.

(Microfibrillated Cellulose)

In the present embodiment, the microfibrillated cellulose has a role to increase the hydrogen bonding points and improve the tensile elastic modulus of the molded product while the dehydration property is ensured.

The microfibrillated cellulose means fibers having a larger average fiber diameter than that of cellulose nanofibers. Specifically, for example, the average fiber diameter is 0.1 to 10 μm, preferably 0.3 to 5 μm, and more preferably 0.5 to 2 μm.

When the average fiber diameter of the microfibrillated cellulose is less than 0.1 μm, the microfibrillated cellulose is not different from cellulose nanofibers, and an effect of increasing strength (particularly flexural modulus) cannot be sufficiently obtained. In addition, the defibration time is long, and a large amount of energy is required. Furthermore, the dehydration property of the cellulose fiber slurry deteriorates. When the dehydration property deteriorates, a large amount of energy is required for drying the molded product or the like when the molded product or the like is manufactured from the cellulose fiber slurry, and by applying a large amount of energy for drying, the microfibrillated cellulose may be thermally deteriorated to lower the strength thereof.

Meanwhile, when the average fiber diameter of the microfibrillated cellulose exceeds 10 μm, the dispersibility tends to be poor, and mixing with the pulp or the cellulose nanofibers may be difficult.

The microfibrillated cellulose may be obtained by defibrating (micronizing) the raw material pulp. As the raw material pulp, a pulp similar to that for obtaining the cellulose nanofibers may be used, and the same pulp as that for obtaining the cellulose nanofibers is preferably used.

The raw material pulp for the microfibrillated cellulose may be pretreated or defibrated by a method similar to the case of the cellulose nanofibers. However, the degree of defibration is different, and for example, it is necessary to perform the defibration within a range where the average fiber diameter is 0.1 μm or more. Hereinafter, differences from the case of the cellulose nanofibers will be mainly described.

The average fiber length (average length of single fibers) of the microfibrillated cellulose is, for example, 0.01 to 1 mm, preferably 0.03 to 0.7 mm, and more preferably 0.05 to 0.5 mm. When the average fiber length is less than 0.01 mm, a three-dimensional network of fibers may not be formed, and the reinforcing effect may be reduced.

The average fiber length may be arbitrarily adjusted by, for example, selection, pretreatment, or defibration of the raw material pulp.

The percentage of fibers each having a length of 0.2 mm or less in the microfibrillated cellulose is preferably 60% or more, more preferably 70% or more, and particularly preferably 75% or more. When the percentage is less than 60%, a sufficient reinforcing effect may not be obtained. Meanwhile, the percentage of fibers each having a length of 0.2 mm or less in the microfibrillated cellulose does not have an upper limit, and all the fibers may each have a length of 0.2 mm or less.

The aspect ratio of the microfibrillated cellulose is preferably 1 to 10000, and more preferably 5 to 5000 when a molded product or the like is manufactured from the cellulose fiber slurry and it is necessary to improve the strength of the molded product or the like while the ductility of the molded product or the like is maintained to some extent.

Note that the aspect ratio is a value obtained by dividing the average fiber length by the average fiber width. It is considered that a larger aspect ratio increases the number of caught portions in the pulp to improve the reinforcing effect, but reduces the ductility of the molded product or the like because of the many caught portions.

The percentage of fibrillation of the microfibrillated cellulose is preferably 0.5% or more, more preferably 1.0% or more, and particularly preferably 1.5% or more. The percentage of fibrillation is preferably 10% or less, more preferably 9% or less, and particularly preferably 8% or less. When the percentage of fibrillation exceeds 10%, the contact area with water is too large, and even when the defibration can be performed within a range where the average fiber width is 0.1 μm or more, dehydration may be difficult.

Meanwhile, when the percentage of fibrillation is less than 0.5%, there are few hydrogen bonds between fibrils, and a strong three-dimensional network may not be formed.

The crystallinity of the microfibrillated cellulose is preferably 45% or more, more preferably 55% or more, and particularly preferably 60% or more. When the crystallinity is less than 50%, the mixability with the pulp or the cellulose nanofibers is improved, but the strength of the fibers themselves is lowered. Therefore, the strength may not be ensured.

Meanwhile, the crystallinity of the microfibrillated cellulose is preferably 90% or less, more preferably 88% or less, and particularly preferably 86% or less. When the crystallinity exceeds 90%, the ratio of strong intramolecular hydrogen bonds increases and the fibers themselves are rigid. Therefore, hydrogen bonding points with the pulp may not sufficiently increase, and the strength of the molded product or the like may not be improved sufficiently when the molded product or the like is manufactured from the cellulose fiber slurry.

The crystallinity of the microfibrillated cellulose may be arbitrarily adjusted by, for example, selection, pretreatment, or a micronization treatment of the raw material pulp.

The pulp viscosity of the microfibrillated cellulose is preferably 1 cps or more, and more preferably 2 cps or more. When the pulp viscosity is less than 1 cps, aggregation of the microfibrillated cellulose may not be suppressed sufficiently.

The freeness of the microfibrillated cellulose is preferably 200 cc or less, more preferably 150 cc or less, and particularly preferably 100 cc or less. When the freeness of the microfibrillated cellulose exceeds 200 cc, the average fiber diameter of the microfibrillated cellulose exceeds 10 μm, and a sufficient strength effect may not be obtained.

The water retention degree of the microfibrillated cellulose is preferably 500% or less, more preferably 450% or less, and particularly preferably 400% or less. When the water retention degree of the microfibrillated cellulose exceeds 500%, the dehydration property tends to be poor, and aggregation may occur.

The water retention degree of the microfibrillated cellulose may be arbitrarily adjusted by, for example, selection, pretreatment, or defibration of the raw material pulp.

The content percentage of the microfibrillated cellulose in the cellulose fibers is preferably 1 to 90% by mass, more preferably 5 to 80% by mass, and particularly preferably 10 to 50% by mass. When the content percentage of the microfibrillated cellulose is less than 1% by mass, a sufficient reinforcing effect may not be obtained.

Meanwhile, when the content percentage of the microfibrillated cellulose exceeds 90% by mass, the content percentage of the pulp or the cellulose nanofibers is relatively reduced, and an effect of containing the pulp or the cellulose nanofibers may not be obtained.

Unless otherwise specified, methods for measuring various physical properties of the microfibrillated cellulose are similar to those for the cellulose nanofibers or the pulp.

(Pulp)

In the present embodiment, the pulp has a role to significantly improve the dehydration property of the cellulose fiber slurry. In addition, the pulp has a role to improve the strength of the molded product when the pulp is used together with the microfibrillated cellulose.

However, the pulp is preferably contained within a predetermined range (to be described later), and is more preferably contained such that a water retention degree ratio (value obtained by dividing the water retention degree of the cellulose fiber slurry by the water retention degree of the cellulose nanofibers) and the self-weight dehydration property of the cellulose fiber slurry are within predetermined ranges (to be described later). By adding such limitations, the strength of a molded product or the like is ensured when the molded product or the like is manufactured from the cellulose fiber slurry. Note that the details of the water retention degree ratio and the self-weight dehydration property will be described later.

When the average fiber diameters of the microfibrillated cellulose, the pulp, and the cellulose nanofibers are within the specific ranges, the content percentage of the pulp in the cellulose fibers is preferably 1 to 50% by mass, more preferably 3 to 40% by mass, and particularly preferably 5 to 20% by mass. When the content percentage of the pulp is less than 1% by mass, the dehydration property of the cellulose fiber slurry may not be improved sufficiently. When the content percentage of the pulp is less than 1% by mass, the strength of a molded product or the like is not necessarily ensured when the molded product or the like is manufactured from the cellulose fiber slurry.

Meanwhile, when the content percentage of the pulp exceeds 50% by mass, the content percentage of the microfibrillated cellulose or the like decreases as a result. Therefore, even if the complementary effect of the cellulose nanofibers is expected, the strength of the molded product or the like may not be ensured.

As the pulp, a pulp similar to the raw material pulp of the microfibrillated cellulose or the cellulose nanofibers may be used. However, as the pulp, the same pulp as the raw material pulp of the microfibrillated cellulose or the cellulose nanofibers is preferably used. When the same pulp as the raw material pulp of the microfibrillated cellulose or the cellulose nanofibers is used as the pulp, the affinity of the cellulose fibers is improved, and as a result, the homogeneity of the cellulose fiber slurry or the molded product or the like is improved.

As the pulp, a pulp containing lignin is preferably used, a mechanical pulp is more preferably used, and BTMP is particularly preferably used. The use of these pulps further improves the dehydration property of the cellulose fiber slurry.

The average fiber diameter (average fiber width, average diameter of single fibers) of the pulp is preferably 10 to 100 μm, more preferably 10 to 80 μm, and particularly preferably 10 to 60 μm. When the average fiber diameter of the pulp is within the above range, the dehydration property of the cellulose fiber slurry is further improved by setting the content percentage of the pulp within the above-described range.

The average fiber diameter of the pulp may be adjusted by, for example, selection or light defibration of the raw material pulp.

A method for measuring the average fiber diameter of the pulp is as follows.

First, 100 ml of an aqueous dispersion of a pulp having a solid concentration of 0.01 to 0.1% by mass is filtered through a Teflon (registered trademark) membrane filter, and solvent substitution is performed once with 100 ml of ethanol and three times with 20 ml of t-butanol. Next, the resulting product is lyophilized and coated with osmium to obtain a sample. An electron microscope SEM image of this sample is observed at any magnification of 100 to 1000 depending on the width of the fibers constituting the sample. Specifically, two diagonals are drawn on the observation image, and three straight lines passing the intersection of the diagonals are arbitrarily drawn. Furthermore, the widths of 100 fibers in total intersecting the three straight lines are visually measured. Then, the median diameter of the measured values is taken as the average fiber diameter.

The freeness of the pulp is preferably 10 to 800 ml, more preferably 200 to 780 ml, and particularly preferably 400 to 750 ml. When the freeness of the pulp exceeds 800 ml, the dehydration property of the cellulose fiber slurry may be improved, but the surface of a molded product or the like tends to be uneven when the molded product or the like is formed from the pulp. In addition, the fibers are rigid and are not integrated with the microfibrillated cellulose or the cellulose nanofibers, and the density may not be improved.

Meanwhile, when the freeness of the pulp is less than 10 ml, the dehydration property of the cellulose fiber slurry may not be improved sufficiently. In addition, the rigidity of the pulp fibers themselves is lowered, and the pulp fibers may not function as fibers supporting the molded product or the like.

The freeness of the pulp is a value measured in accordance with JIS P8121-2 (2012).

(Preparation of Slurry)

As illustrated in FIG. 1, fine fibers (microfibrillated cellulose, or microfibrillated cellulose and cellulose nanofibers) C and pulp P are mixed at the predetermined ratio, preferably mixed such that the content percentage of pulp P is within the above-described range to prepare cellulose fiber slurry S (slurry preparation step 10). The fine fibers C and the pulp P may also be mixed while each of the fine fibers C and the pulp P is in a state of a dispersion.

When the fine fibers C and the pulp P are mixed, the solid concentration of the cellulose fibers in the cellulose fiber slurry S is preferably adjusted, for example, by adding a medium W such as water. The solid concentration of the cellulose fibers is preferably 1 to 15% by mass, more preferably 1 to 7% by mass, and particularly preferably 1 to 5% by mass. When the solid concentration of the cellulose fibers is less than 1% by mass, fluidity is high, and a possibility that the cellulose fibers may flow out in dehydration step 30 may be high.

Meanwhile, when the solid concentration of the cellulose fibers exceeds 15% by mass, the fluidity may be significantly lowered, and processability may be deteriorated. Therefore, for example, unevenness in thickness is likely to occur in a step of manufacturing the molded product, and it may be difficult to obtain a homogeneous molded product.

The entire medium (aqueous medium) W such as water is preferably water. However, the aqueous medium W may partially be another liquid that is compatible with water. As the other liquid, for example, a lower alcohol having 3 or less carbon atoms or a ketone having 5 or less carbon atoms may be used.

The water retention degree ratio of the cellulose fiber slurry is preferably 0.50 to 0.99, more preferably 0.55 to 0.98, and particularly preferably 0.60 to 0.97 by appropriately adjusting the content percentage of the pulp.

In addition to the above, the self-weight dehydration property of the cellulose fiber slurry is preferably 1.1 to 3.0, more preferably 1.2 to 2.0, and particularly preferably 1.3 to 1.8 by appropriately adjusting the kind and the content percentage of the pulp.

By setting the water retention degree ratio of the cellulose fiber slurry S to 0.50 or more and setting the self-weight dehydration property thereof to 3.0 or less, the strength of a finally obtained molded product (final product) X may be ensured.

The water retention degree of the cellulose fiber slurry S is a value measured by the following method.

First, the cellulose fiber slurry (concentration 2% by mass) is dehydrated by a centrifuge (condition: 3000 G, 15 minutes), and the mass of the obtained dehydrated product is measured. Next, the dehydrated product is completely dried, and the mass of the obtained dried product is measured. Then, it is assumed that the water retention degree (%)=(mass of dehydrated product−mass of dried product)/mass of cellulose fiber slurry×100 is satisfied.

The water retention degree refers to the amount of water remaining in the slurry after applying a constant centrifugal force to the slurry. The lower the water retention degree is, the better the dehydration property is. In addition, the lower the water retention degree ratio is, the more the water retention degree has decreased from that of the original cellulose nanofiber slurry, and the more the dehydration property has increased.

Meanwhile, the self-weight dehydration property of the cellulose fiber slurry is a value measured by the following method.

The cellulose fiber slurry is applied to a wire mesh (300 mesh, width 10 cm×length 10 cm×thickness 2 mm) on a water-absorbent base material, and left for two minutes. Then, it is assumed that self-weight dehydration property=solid concentration after being left for two minutes/solid concentration before application is satisfied.

(Molded Product)

By appropriately subjecting the slurry obtained as described above to wet paper formation 20, dehydration 30, pressurization heating 40, and the like, a molded product X may be obtained. There are various methods for manufacturing the molded product X from the slurry S, but for example, the method described in JP 2018-62727 A (cellulose nanofiber molded product) is preferable. Note that the above-described method for forming wet paper is a preferable example, and the manufacturing method of the present embodiment is not limited to the above-described method.

The density of the molded product X obtained as described above is preferably 0.8 to 1.5 g/m³, more preferably 0.9 to 1.4 g/m³, and particularly preferably 1.0 to 1.3 g/m³. When the density of the molded product X is less than 0.8 g/m³, the strength may be considered to be insufficient due to decrease in the hydrogen bonding points.

The density of the molded product X is a value measured in accordance with JIS-P-8118: 1998.

The tensile fracture strain of the molded product X is preferably 10% or less, more preferably 5% or less, particularly preferably 4% or less, and most preferably 3% or less. When the tensile fracture strain exceeds the above upper limit, the strain is large, and applications may be limited. Meanwhile, the tensile fracture strain of the molded product X is most preferably 0%, but for example, 1 to 3% is acceptable.

The tensile fracture strain of the molded product X is a value measured in accordance with JIS K7127: 1999 at a temperature of 23° C. with a test piece having the tensile No. 2 type dumbbell shape specified in JIS-K6251 at a test speed of 10 mm/min.

(Others)

If necessary, to the cellulose fiber slurry S, an additive such as an antioxidant, a corrosion inhibitor, a light stabilizer, an ultraviolet absorber, a heat stabilizer, a dispersant, a defoamer, a slime control agent, or a preservative may be added.

EXAMPLES

Next, Examples of the present invention will be described.

First, a cellulose fiber slurry was prepared using a microfibrillated cellulose, a pulp, and cellulose nanofibers as cellulose fibers. LBKP, which is a paper pulp, was used as a raw material pulp for the microfibrillated cellulose and the cellulose nanofibers, and the pulp. The microfibrillated cellulose was obtained by pre-beating the raw material pulp (water content 98% by mass) with a refiner. This microfibrillated cellulose was an aqueous dispersion having a concentration of 2.5% by mass. The obtained microfibrillated cellulose had an average fiber diameter of 1 µm, a water retention degree of 296%, and a crystallinity of 75%. Meanwhile, the cellulose nanofibers were obtained by defibrating the above microfibrillated cellulose with a high-pressure homogenizer. These cellulose nanofibers were in the form of an aqueous dispersion having a concentration of 2.0% by mass. The obtained cellulose nanofibers had an average fiber diameter of 30 nm, a water retention degree of 348%, and a crystallinity of 75%. The microfibrillated cellulose, the pulp, and the cellulose nanofibers were mixed at a ratio illustrated in Table 1 to set a solid concentration to 2.0% by mass.

Next, a sheet (molded product) having a thickness of 100 µm was prepared from the obtained cellulose fiber slurry, and tests were performed to determine the tensile elastic modulus and the tensile strength of the molded product. Specifically, first, wet paper was prepared from the cellulose fiber slurry, and the wet paper was subjected to pressurization dehydration and pressurization heating to prepare a molded product. The pressurization dehydration was performed at 25° C. at 2 MPa for five minutes. The pressurization heating was performed at 120° C. at 2 MPa for five minutes. The obtained molded product had a density of 1.0 g/m³.

The results are illustrated in Table 1. Note that the methods for measuring the tensile elastic modulus and the tensile strength are as follows.

The tensile elastic modulus was measured in accordance with JIS K7127: 1999. The test piece (sheet) had the tension No. 2 type dumbbell shape specified in JIS-K6251. The test speed was 10 mm/min. The measurement was performed at a temperature of 23° C. at a humidity of 50%.

The tensile strength was measured in accordance with JIS K7127: 1999. The test piece (sheet) had the tension No. 2 type dumbbell shape specified in JIS-K6251. The test speed was 10 mm/min. The measurement was performed at a temperature of 23° C. at a humidity of 50%.

TABLE 1

| | Content percentage (%) | | | Tensile elastic modulus | Tensile strength |
|---|---|---|---|---|---|
| | CNF | Pulp | MFC | GPa | MPa |
| Test Example 1 | 80 | 20 | 0 | 13.8 | 78.0 |
| Test Example 2 | 70 | 20 | 10 | 16.7 | 82.2 |
| Test Example 3 | 60 | 20 | 20 | 20.4 | 81.3 |
| Test Example 4 | 50 | 20 | 30 | 20.1 | 87.4 |
| Test Example 5 | 40 | 20 | 40 | 21.9 | 95.4 |
| Test Example 6 | 30 | 20 | 50 | 21.0 | 83.4 |
| Test Example 7 | 20 | 20 | 60 | 21.1 | 64.7 |
| Test Example 8 | 10 | 20 | 70 | 19.0 | 64.3 |
| Test Example 9 | 0 | 20 | 80 | 19.8 | 60.4 |
| Test Example 10 | 0 | 0 | 100 | 13.7 | 86.4 |

DISCUSSION

From Table 1, it can be seen that the tensile elastic modulus is improved when the cellulose fibers contain the microfibrillated cellulose together with the pulp. In addition, in this case, it can be seen that the tensile strength is also improved when the cellulose fibers further contain the cellulose nanofibers at a content percentage of 70% by mass or less.

INDUSTRIAL APPLICABILITY

The present invention may be used as a cellulose fiber molded product and a method for manufacturing the same.

REFERENCE SIGNS LIST

10 Slurry preparation step
20 Wet paper forming step
30 Dehydration step
40 Pressurization heating step
C Fine fibers
P Pulp
W Medium, such as water
X Molded product

The invention claimed is:
1. A cellulose fiber molded product comprising
cellulose fibers as a main component,
wherein the cellulose fibers comprise pulp and defibrated fibers,
wherein the defibrated fibers comprise microfibrillated cellulose and cellulose nanofibers, wherein the pulp has an average fiber diameter of 10 to 100 μm, the microfibrillated cellulose has an average fiber diameter of 0.1 to 10 μm, and the cellulose nanofibers have an average fiber diameter of 10 to 100 nm, and wherein a content percentage of the microfibrillated cellulose fibers in the cellulose fibers ranges from 10% to 50% by mass, a content percentage of the cellulose nanofibers in the cellulose fibers ranges from 30% to 70% by mass, and a content percentage of the pulp in the cellulose fibers ranges from 1% to 50% by mass.

2. The cellulose fiber molded product according to claim 1,
wherein the content percentage of the pulp in the cellulose fibers is 5 to 20% by mass.

3. A method for manufacturing a cellulose fiber molded product, the method comprising:
preparing a cellulose fiber slurry using pulp and defibrated fibers; forming wet paper from the cellulose fiber slurry; and pressurizing and heating the wet paper to prepare a molded product,
wherein the defibrated fibers comprise microfibrillated cellulose and cellulose nanofibers,
wherein the pulp has an average fiber diameter of 10 to 100 μm, the microfibrillated cellulose has an average fiber diameter of 0.1 to 10 μm, and the cellulose nanofibers have an average fiber diameter of 10 to 100 nm, and
wherein a content percentage of the microfibrillated cellulose fibers in the cellulose fibers ranges from 10% to 50% by mass, a content percentage of the cellulose nanofibers in the cellulose fibers ranges from 30% to 70% by mass, and a content percentage of the pulp in the cellulose fibers ranges from 1% to 50% by mass.

4. The cellulose fiber molded product according to claim 1, wherein a water retention degree of the microfibrillated cellulose is 400% or less and a water retention degree of the cellulose nanofibers ranges from 240% to 460%.

5. The cellulose fiber molded product according to claim 1, wherein a crystallinity of the microfibrillated cellulose and the cellulose nanofibers ranges from 45% to 90%.

* * * * *